United States Patent [19]

Yamazaki

[11] Patent Number: 5,649,141
[45] Date of Patent: Jul. 15, 1997

[54] MULTIPROCESSOR SYSTEM FOR LOCALLY MANAGING ADDRESS TRANSLATION TABLE

[75] Inventor: Takeshi Yamazaki, Tokyo, Japan

[73] Assignee: NEC Corporation, Tokyo, Japan

[21] Appl. No.: 497,447

[22] Filed: Jun. 30, 1995

[30] Foreign Application Priority Data

Jun. 30, 1994 [JP] Japan .................................. 6-149440

[51] Int. Cl.⁶ ............................................. G06F 12/10
[52] U.S. Cl. ................................... 395/416; 395/419
[58] Field of Search ................................. 395/420, 474, 395/475, 416, 417, 413, 412, 419

[56] References Cited

U.S. PATENT DOCUMENTS

| | | | |
|---|---|---|---|
| 4,648,035 | 3/1987 | Fava | 395/412 |
| 4,980,822 | 12/1990 | Brantley | 395/412 |
| 5,247,629 | 9/1993 | Casamatta | 395/416 |
| 5,437,017 | 7/1995 | Moore | 395/200.08 |
| 5,497,480 | 3/1996 | Hayes | 395/493 |

OTHER PUBLICATIONS

Association for Computing Machinery, "Memory Coherence in Shared Virtual Memory Systems", vol. 7, No. 4, pp. 321–359, Nov. 1989.
Computer Networks, Andrew Tanenbaum, ISBN 0-13-165183-8, 1981.

*Primary Examiner*—Tod R. Swann
*Assistant Examiner*—Christopher S. Chow
*Attorney, Agent, or Firm*—Foley & Lardner

[57] ABSTRACT

An address translation technique used in a multiprocessor system is disclosed. In a multiprocessor system for connecting a plurality of clusters with each other via a network, each of these clusters is arranged by comprising a plurality of processors; a cluster translator for translating a cluster number; a cluster translation table for storing therein a correspondence relationship between a logical cluster number and a physical cluster number; an address translator for translating an address; and an address translation table for storing therein a correspondence relationship between a logical address and a physical address. The address translation table stores only the data corresponding to a memory employed in the cluster. Accordingly, a total storage capacity of the address translation tables is reduced, and an updating operation of the address translation tables is simplified. Furthermore, the address translation table is exclusively identified based on a local job number and the cluster number, so that operation to update the address translation table is simplified.

5 Claims, 6 Drawing Sheets

CLUSTER TRANSLATION TABLE

FIG. 3

| PHYSICAL CLUSTER NUMBER | | #0 | #1 | #2 | #3 | #4 | #5 | #6 | #7 |
|---|---|---|---|---|---|---|---|---|---|
| JOB1 | LOGICAL CLUSTER No | $0 | $2 | — | $1 | — | — | — | — |
| | LOCAL JOB No. | %0 | %3 | — | %1 | — | — | — | — |
| JOB2 | LOGICAL CLUSTER No | — | $3 | $2 | $1 | $0 | $4 | $6 | $5 |
| | LOCAL JOB No. | — | %1 | %2 | %0 | %1 | %1 | %4 | %1 |
| JOB3 | LOGICAL CLUSTER No | — | $0 | — | — | — | — | — | — |
| | LOCAL JOB No. | — | %4 | — | — | — | — | — | — |

# MULTIPROCESSOR SYSTEM FOR LOCALLY MANAGING ADDRESS TRANSLATION TABLE

BACKGROUND OF THE INVENTION

The present invention generally relates to a multiprocessor system, and more specifically, to a multiprocessor system for managing a processor in every cluster.

In case that a memory access operation is carried out in such a kind of multiprocessor system, each of these processors may include address translation tables with respect to all address spaces, and separately performs the address translations. However, in this case, the following problem as to the memory capacity may be occurred. That is, a total storage capacity of the address translation tables required for the entire multiprocessor system would be increased in proportion to the square number of the processors employed in the multiprocessor system.

In case that a plurality of processors access to the same data space, the address translation table corresponding to this data space is stored distributedly into the plurality of processors. As a consequence, these distributed address translation tables are updated over a plurality of processors, and thus the table updating becomes complex.

Kai Li and Paul Hudak studied the memory coherence problem in designing and implementing a shared virtual memory on loosely coupled multiprocessors. The study is described in Pages 321–359 of ACM (Association for Computing Machinery) Transactions on Computer Systems, Vol.7, No.4, November 1989. The shared virtual memory is a single address space shared by a number of processors. The shared virtual memory provides a virtual address space that is shared among all processors in a loosely coupled distributed-memory multiprocessor system. Any processor can access any memory location in the address space directly. The shared virtual memory not only shares data between physical memories and disks, as in a conventional virtual memory system, but it also shares data between the physical memories of the individual processors. Each processor has a mapping manager for mapping between local memories and the shared virtual memory address space. Since the shared memory itself exists only virtually like the traditional virtual memory, a memory reference causes a page fault when the page containing the memory location is not in a processor's current physical memory. Therefore, the mapping manager owns the address translation table over the all memory space in the system.

SUMMARY OF THE INVENTION

The present invention has been made to solve the above-described problem about the memory storage capacity with respect to the address translation table, and therefore, has an object to provide a multiprocessor system having a small memory storage capacity required for the address translation tables.

Another object of the present invention is to solve the above-mentioned problem of requiring the complex operation to update the address translation tables, and thus to provide a multiprocessor system capable of simply updating address translation tables.

In a multiprocessor system, according to one aspect of the present invention, comprising a plurality of clusters each having a memory and at least one processor, and a network for connecting the plural clusters with each other, each of these clusters translates a logical address into a physical address with respect only to the memory belonging to the corresponding cluster.

BRIEF DESCRIPTION OF THE DRAWINGS

Various embodiments of the present invention will be more apparent on reading the following description with reference to the accompanying drawings, in which:

FIG. 3 illustrates an example of a job allocation performed in the multiprocessor system of the embodiment of the present invention;

DETAILED DESCRIPTION OF THE PREFERRED EMBODIMENTS

A multiprocessor system according to an embodiment of the present invention will now be described in detail.

Figure 1:
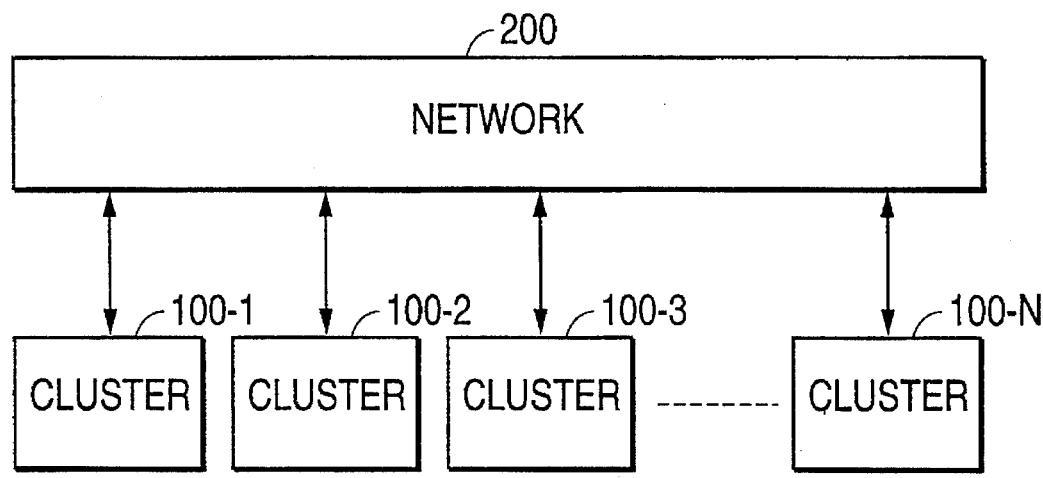
FIG. 1 schematically represents an overall arrangement of a multiprocessor system according to an embodiment of the present invention.

As represented in FIG. 1, the multiprocessor system according to one embodiment of the present invention includes such an arrangement where N clusters 100 are mutually connected via a network 200, where symbol N indicates any integer greater than 1. Each of the clusters 100-1 ... 100-N includes at least one processor. The network 200 transfers such information as a memory access request to one cluster for example cluster 100 in accordance to destination given from another cluster, for example cluster 100-2.

Figure 2:
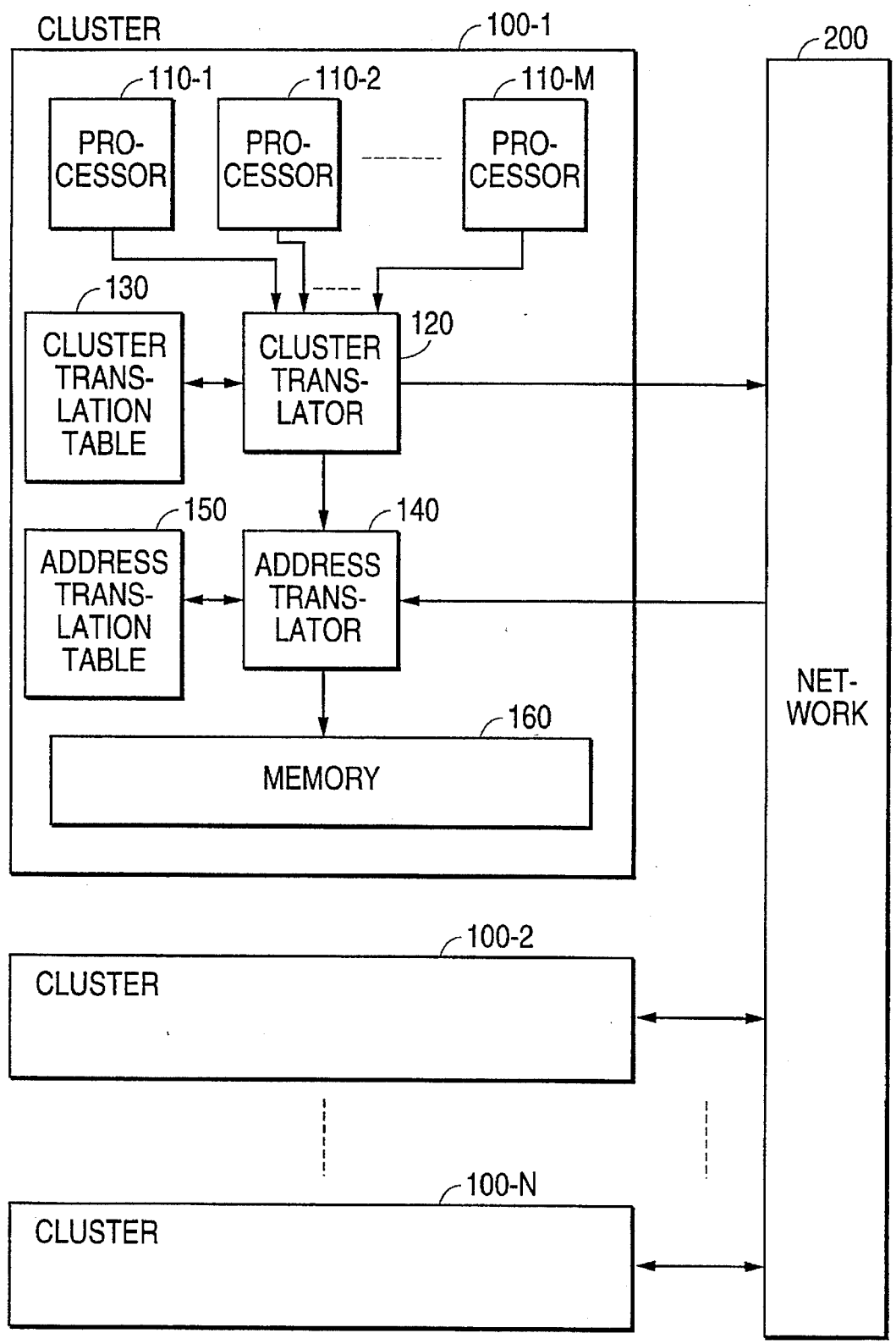
FIG. 2 schematically shows an arrangement of a cluster employed in the multiprocessor system of the embodiment of the present invention.

Referring now to the internal arrangement of the cluster, as shown in FIG. 2, one cluster 100-1 includes M processors 110 ("M" being any integer larger than 1); a cluster translator 120 for translating a cluster number; a cluster translation table 130 for storing therein a relationship between a logical cluster number and a corresponding physical cluster number; an address translator 140 for translating an address; and an address translation table 150 for storing therein a relationship between a logical address and a corresponding physical address.

A processor for example, processor 110-1, issues an access request to a memory and executes a calculation process and the like. After receiving a virtual address sent from the processor 110-1, the cluster translator 120 translates a logical cluster number contained in this virtual address into a physical cluster number corresponding thereto based on a cluster translation table 130, thereby producing an intermediate address. The cluster translator 120 determines whether or not a memory to be accessed is included in a cluster. When the memory to be accessed is present outside the cluster, a memory access request is sent to the cluster where the memory is present via the network 200. When the memory to be accessed is present within the cluster, a memory access request is sent to the address translator 140. The address translator 140 produces a physical address from a logical address containing an intermediate address, and transfers the access request to the memory 160.

Each of the clusters may solely execute a single job, and further may execute the same job with other clusters in a parallel manner. In each of the clusters, each processor may solely execute a single job, and also may simultaneously execute the same job together with other processors within this cluster. As a consequence, there is such a possibility that a plurality of jobs are executed by a single cluster at the same time.

When a certain job is executed, logical cluster numbers different from each other are allocated to the respective clusters which execute this same job. This logical cluster number is individually allocated to each of the jobs. Accordingly, a plurality of different logical cluster numbers may be allocated to a certain physical cluster number.

Referring to FIG. 3, as a concrete example of the job allocation, a job 1 is allocated to three physical clusters, namely a first, a second, and a third. This physical cluster number will be indicated as "#0" and the like, hereinafter. First to second logical cluster numbers are attached to each of the clusters to which this job 1 has been allocated. This logical cluster number will be represented as "$0" and the like hereinafter. Similarly, a job 2 is allocated to physical clusters #1 to #7 and is handled as logical clusters $0 to $6. A job 3 is allocated only to a single physical cluster #1.

As seen from FIG. 3, the logical cluster numbers corresponding to the respective jobs are individually allocated to other jobs on the same physical cluster. Accordingly, in case of the physical cluster #3, the same logical clusters "$1" are given to the same physical cluster #3. In case of the physical cluster #1, the different logical cluster numbers $0, $2 and $3 are attached to the same physical cluster #1.

In the respective clusters, local job numbers are attached to the respective jobs under execution within this cluster for management purpose. This local job number will be referred to "%0" and the like hereinafter. This local job number is individually allocated to each of the clusters. As a consequence, even in the same job, the different local job number may be attached thereto in other clusters. For example, in FIG. 3, the local job numbers of the job 2, %0, %1, %2 or %4 are attached to this job 2.

Figure 4A:
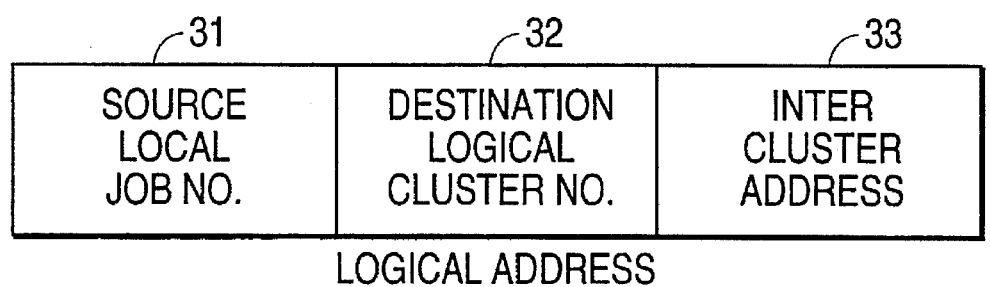
FIGS. 4A and 4B schematically show structures of addresses used in the multiprocessor system of the embodiment of the present invention.

Referring now to FIG. 2 and FIG. 4A, when the processor 110 performs the memory access operation, a virtual address is designated as an accessing address. This virtual address is arranged by, as shown in FIG. 4A, a source local job number 31, a destination logical cluster number 32, and an inter cluster address 33. The processor 110-1 includes a register (not shown in the figures) for holding a local job number corresponding to such a job under execution by the processor 110-1, and generates the source local job number 31 based on this local job number. As previously described, since the logical cluster number is exclusively allocated to a predetermined cluster within the same job, the destination logical cluster number 32 may exclusively identify this predetermined cluster within the same job. The inter cluster address 33 represents such an inter cluster address in the cluster identified by the source job number 31 and the destination logical cluster number 32.

Figure 5:
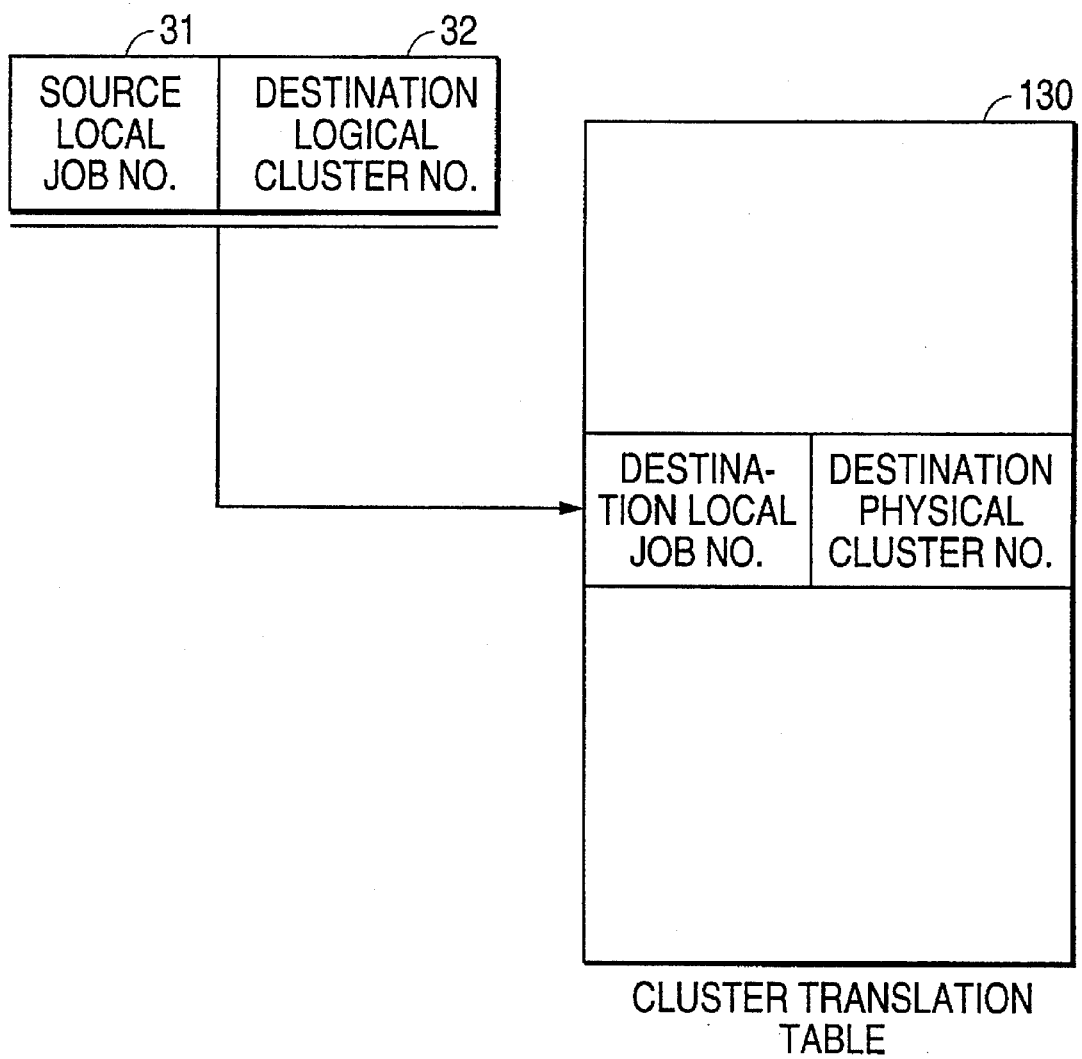
FIG. 5 schematically represents an arrangement of a cluster translation table employed in the multiprocessor system according to the embodiment of the present invention.

Referring to FIG. 2 and FIG. 5, the cluster translator 120 retrieves the cluster translation table 130 by using the source local job number 31 and the destination logical cluster number 32 within the virtual address received from the processor 110. As represented in FIG. 5, the cluster translation table 130 stores therein a plurality of entries each containing a destination local job number and a destination physical cluster number. A destination physical cluster number represents a physical cluster number having a memory corresponding to this memory access operation. A destination local job number indicates a local job number in a destination cluster.

Figure 4B:
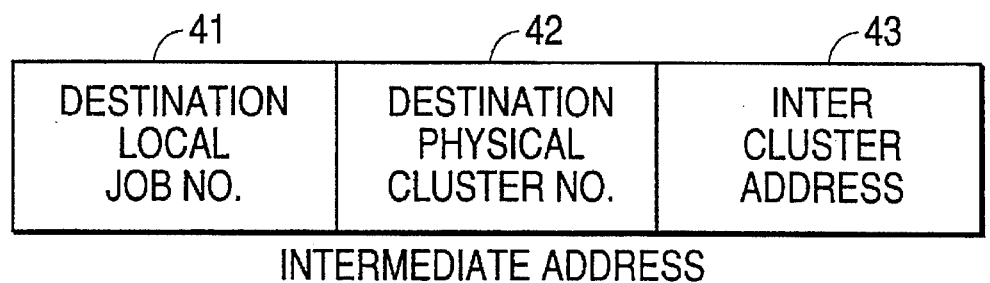

Referring to FIG. 4B and FIG. 5, both of the destination local job number and the destination physical cluster number, which are retrieved based on such an address for combining the source local job number 31 with the destination logical cluster number 32, constitute an intermediate address as represented in FIG. 4B as a destination local job number 41 and a destination physical cluster number 42. The inter cluster address 43 is identical to an inter cluster address 33 of the virtual address.

Referring again to FIG. 2, the cluster translator 120 issues a memory access request based upon the intermediate address produced in such a manner. At this time, if the destination physical cluster number 42 indicates another cluster, then this memory access request is sent to the network 200. When the destination physical cluster number 42 indicates the source cluster, this memory access request is sent to the address translator 140 employed in the source cluster.

After receiving the memory access request to another cluster, the network 200 transfers this memory access request to the relevant cluster in accordance with the destination physical cluster number 42 contained in the intermediate address. As a result, the address translator 140 of the destination class receives the memory access request. This memory access request contains the destination local job number 41 and the inter cluster address 43 among the intermediate address.

Figure 6:
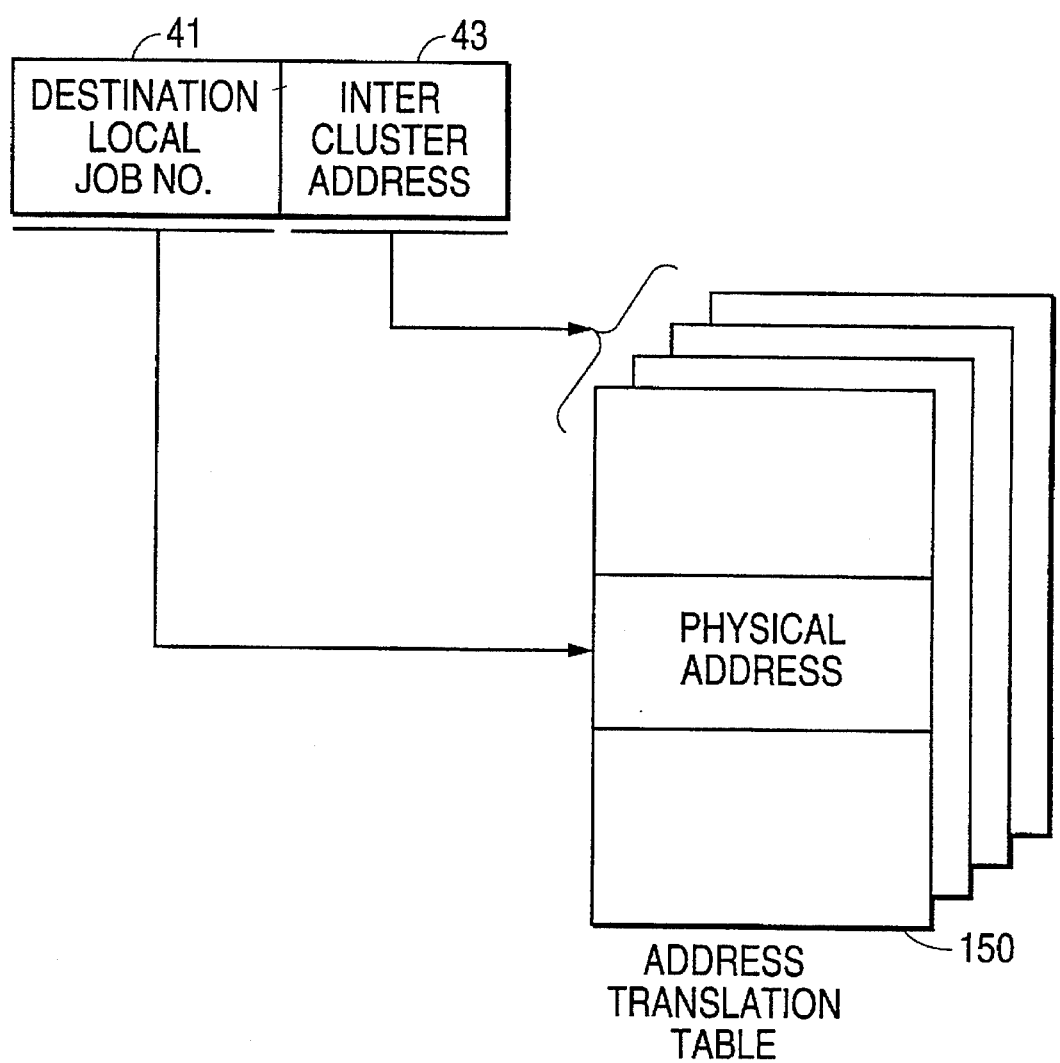
FIG. 6 schematically indicates an arrangement of an address translation table employed in the multiprocessor system according to the embodiment of the present invention.

Referring to FIG. 2 and FIG. 6, after receiving the memory access request via the network 200 or from the cluster translator 120 employed in the cluster, the address translator 140 retrieves an address translation table 150 by using the destination local job number 41 and the inter cluster address 43. The address translation table 150 includes a plurality of tables which each corresponds to each of the local jobs in the relevant cluster. Then, each of the entries located by the logical address within the cluster stores therein the physical address corresponding to this logical address.

The address translator 140 reads out the physical address from the entry located by the inter cluster address 43 in the address translation table identified by the destination local job number 41. Then, the memory access request is issued to the memory 160 by using this physical address.

Figure 7:
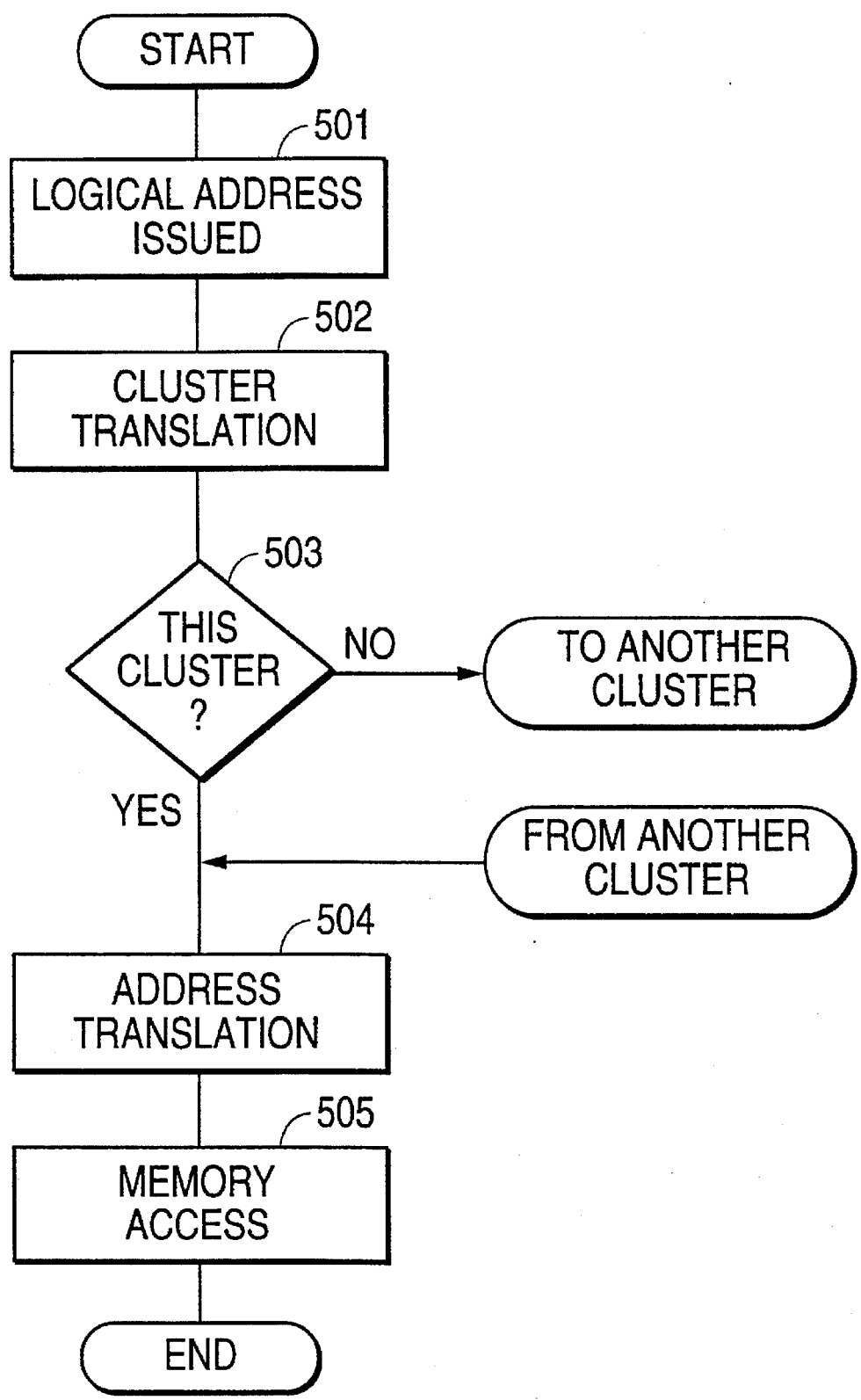
FIG. 7 is a flow chart for explaining operations of the multiprocessor system according to the embodiment of the present invention.

In FIG. 7, there is shown a flow chart for representing operations of the multiprocessor system according to an embodiment of the present invention. Referring now to FIG. 2 and FIG. 7, this operation of the multiprocessor will be described. In FIGS. 2 and 7, a memory access request is issued from one processor, for example, processor 110-1, in a certain cluster, for example, cluster 100-1, to the cluster translator 120 (step 501). In this memory access request, a virtual address is designated as an address to be accessed. The virtual address is translated into an intermediate address based on the cluster translation table 130 (step 502). When the physical cluster number contained in the intermediate address represents other clusters, the cluster translator 120 sends out the memory access request to the network 200 (step 503).

After receiving the memory access request via the network 200 or from the cluster translator 120 employed in the cluster, the address translator 140 retrieves the address translation table 150, thereby translating the logical address containing this intermediate address into the physical address (step 504). This physical address is used to access to the memory 160 (step 505).

As described above, in the multiprocessor system according to one embodiment of the present invention, since the address translation table 150 is provided only in the cluster 100 where the memory 160 to be accessed is present, a total storage capacity of the address translation table 150 required for the entire multiprocessor system can be reduced. Also, since the address translation table 150 may be exclusively identified based on either both of the source local job number 31 and the destination logical cluster number 32, or both of the destination local job number 41 and the destination physical cluster 42, such a conventional complex operation for updating a plurality of address translation tables is unnecessary.

As apparent from the foregoing descriptions, according to the present invention, there is employed the address translation table only in the cluster where the memory to be accessed is located. Accordingly, there is such an effect that a total storage capacity of the address translation table will be reduced.

Furthermore, as the address translation table is exclusively identified based on the local job number and the cluster number, there is another effect that the updating operation of the address translation table will be simplified.

Also, even when the quantity of clusters employed in the multiprocessor is increased, a total storage capacity of the address translation table can be maintained constant.

What is claimed is:

1. A multiprocessor system comprising a plurality of clusters each having a memory and at least one processor, and a network for connecting said plural clusters with each other, wherein:

a first cluster includes cluster translating means for translating a virtual address corresponding to a first memory access request issued from a processor in the first cluster into an intermediate address, and for sending a second memory access request, based on the intermediate address, via said network to a second cluster when the intermediate address corresponds to said second cluster; and said second cluster includes address translating means for producing a physical address from the intermediate address corresponding to said second memory access request issued from said first cluster, thereby accessing to a memory in the second cluster designated by said produced physical address, and wherein:

said virtual address includes a source local job number allocated to a job executed by said processor in said first cluster, a destination logical cluster number, and a logical address;

said intermediate address includes a destination local job number, a destination physical cluster number, and the logical address;

said cluster translating means generates the destination local job number and the destination physical cluster number from the source local job number and the destination logical cluster number, said first cluster sending the second memory access request to said second cluster when a cluster designated by the destination physical cluster number corresponds to said second cluster;

said network transfers the second memory access request issued from said first cluster to said second cluster in accordance with the destination physical cluster number of said second cluster; and said address translating means produces a physical address from both of the destination local job number in said second cluster and the logical address within said second cluster, thereby accessing to said memory in the second cluster designated by said produced physical address.

2. A multiprocessor system as claimed in claim 1 wherein:

said first cluster transfers the second memory access request to an address translating means in said first cluster when said cluster designated by the destination physical cluster number corresponds to said first cluster.

3. A multiprocessor system as claimed in claim 1 wherein:

said address translating means includes a plurality of address translation tables in which physical addresses are stored in corresponding entries, and one of said address translation tables is identified based on the destination local job number, and said produced physical address is retrieved from the identified address translation table based on the logical address within said second cluster.

4. A method of translating addresses for a system comprising a first cluster connected to a second cluster via a network, each of the first cluster and the second cluster having a processor and a memory, said method comprising the steps of:

(A) issuing a first memory access request in the first cluster, the first memory access request corresponding to a virtual address including a source local job number allocated to a job executed by the processor in the first cluster, a destination logical cluster number, and a logical address;

(B) translating, in the first cluster, the virtual address into an intermediate address including a destination local job number, a destination physical cluster number, and the logical address, the translating in step (B) being based on the source local job number and the destination logical cluster number;

(C) sending, from the first cluster via the network, a second memory access request to the second cluster if the destination physical cluster number from the intermediate address corresponds to the second cluster, the second memory access request corresponding to the intermediate address; and (D) translating, in the second cluster, the intermediate address into a physical address of the memory in the second cluster, the translating in step (D) being based on the destination local job number and the logical address.

5. The method of translating addresses according to claim 4 wherein step (D) comprises the steps of:

(i) identifying an address translation table corresponding to the destination local job number; and (ii) reading out the physical address of the memory in the second cluster from an entry in the address translation table identified in step (i), said entry corresponding to the logical address.

* * * * *